United States Patent [19]
Ito

[11] Patent Number: 5,631,051
[45] Date of Patent: May 20, 1997

[54] OPTICAL COMPENSATORY SHEET

[75] Inventor: Yoji Ito, Kanagawa, Japan

[73] Assignee: Fuji Photo Film Co., Ltd., Minami-ashigara, Japan

[21] Appl. No.: 630,775

[22] Filed: Apr. 10, 1996

[30] Foreign Application Priority Data

Apr. 11, 1995 [JP] Japan ................................ 7-085553
Jul. 14, 1995 [JP] Japan ................................ 7-201512

[51] Int. Cl.$^6$ .................................................. G02F 1/1335
[52] U.S. Cl. .................... 428/1; 428/522; 359/76; 359/73
[58] Field of Search ................ 428/1, 522; 359/73, 359/76; 427/162, 164

[56] References Cited

U.S. PATENT DOCUMENTS 5,528,400  6/1996  Akarawa ................................ 359/73

*Primary Examiner*—Alexander Thomas
*Attorney, Agent, or Firm*—Burns, Doane, Swecker & Mathis, LLP

[57] ABSTRACT

An optical compensatory sheet is composed of a transparent support, an orientation layer and an optically anisotropic layer. The orientation layer is a crosslinked polymer layer a surface of which has been subjected to rubbing treatment, and the optically anisotropic layer is made of a discotic liquid crystalline compound. A liquid crystal display is composed of a liquid crystal cell, a polarizing sheet arranged on each side of the cell, and the optical compensatory sheet provided between at least one side of the liquid crystal cell and the polarizing sheet. A color liquid crystal display has also the optical compensatory sheet.

15 Claims, 6 Drawing Sheets

OPTICAL COMPENSATORY SHEET

BACKGROUND OF THE INVENTION

1. Field of the Invention

The present invention relates to an optical compensatory sheet, a process for preparation of the sheet, the liquid crystal display provided with the sheet and a color liquid crystal display provided with the sheet.

2. Description of Prior Art

As a display for electronic office system-devices such as a desk-top personal computer and a word processor, CRT (cathode ray tube) has been employed. Recently, a liquid crystal display (hereinafter referred to as LCD) is widely employed instead of the CRT because of its small thickness, light weight and low power consumption. LCD generally has a structure that a liquid crystal cell is disposed between a pair of polarizing sheets. The liquid crystal cell comprises a pair of substrates provided with transparent electrode and a liquid crystalline compound sealed therebetween.

Most of LCD having the above structure use a twisted nematic liquid crystal. Operational mode of LCD using the twisted nematic liquid crystal is roughly divided into two types, i.e., a birefringence mode and an optical rotatory mode.

A super twisted nematic liquid crystal display (hereinafter referred to as STN-LCD) utilizing the birefringence mode uses a super twisted nematic liquid crystal showing a twisted angle of more than 90 degrees and having steep electro-optical characteristics. Such STN-LCD, therefore, has an advantage of giving display of a large area by driving in time-sharing mode. However, the STN-LCD has disadvantages such as slow response (such as several hundred milliseconds) and difficulty in giving satisfactory gradation on display, and therefore its display characteristics are relatively poor, as compared with display characteristics of a liquid crystal display using the known active-type elements (e.g., TFT-LCD and MIM-LCD).

In the TFT-LCD and MIM-LCD, twisted nematic liquid crystal showing a twisted angle of 90 degrees and having positive birefringence is employed for displaying an image. This is called LCD of an optically rotary mode (i.e., TN-LCD). TN-LCD display mode shows rapid response (such as several tens of milliseconds) and high display contrast, and easily gives black-and-white display of high contrast. Hence, the optical rotatory mode has a number of advantages compared with the birefringence mode or other modes. However, TN-LCD has disadvantages that color or contrast on display varies depending upon viewing angle to the liquid crystal display, and its display characteristics are not comparable to display characteristics of CRT.

In order to improve the viewing angle characteristics (i.e., to enlarge the viewable angle), arrangement of a phase difference film (optical compensatory sheet) between a pair of polarizing plates and TN liquid crystal cell has been proposed.

The optical compensatory sheets show no optical effect when a liquid crystal display is seen from the direction vertical to the screen of the display because phase difference in the direction perpendicular to a surface of the liquid crystal display is almost zero. However, the optical compensatory sheet serves for compensating phase difference (depending upon wavelengths of light) that occurs when the liquid crystal display is viewed from an oblique direction. The phase difference results in unfavorable viewing angle characteristics such as coloring and disappearance of displayed image.

It is known that the optical compensatory sheet is needed to have negative birefringence for compensating positive birefringence of the twisted nematic liquid crystal and an inclined optic axis.

EP 0576304-A1 discloses an optical compensatory sheet having the negative birefringence and inclined optic axis. In more detail, the disclosed sheet is prepared by stretching a polymer such as polycarbonate or polyester and has the directions of the main refractive indices which are inclined from the normal of the sheet. To prepare the above sheet by the stretching treatment, extremely complicated treatments are required. Therefore an optical compensatory sheet of a large surface area cannot be easily prepared according to the disclosed process.

Also known is an optical compensatory sheet comprising a liquid crystalline polymer. For instance, Japanese Patent Provisional Publications No. 3(1991)-9326 and 3(1991)-291601 disclose an optical compensatory sheet for LCD which is prepared by coating a solution of polymer showing liquid crystal property on an orientation layer provided on a support film. As a polymer for the orientation layer, polyimide is employed. Further, polyamide such as nylon (No. 3(1991)-9326) and polyvinyl alcohol (No. 3(1991)-291601) are also described as other polymer examples. The liquid crystalline polymer does not generally show negative birefringence, and further the liquid crystalline polymer cannot be satisfactorily oriented. Hence, the resulting compensatory sheet cannot enlarge satisfactorily the viewing angle from all directions.

Japanese Patent Provisional Publication No. 5(1993)-215921 discloses the use of a birefringence plate (optical compensatory sheet) comprising a support and a polymerizable lod-like compound showing liquid crystal property and positive birefringence. The birefringence plate is prepared by coating a solution of the lod-like compound on the support and curing the compound with orienting the compound by the application of magnetic or electric field. Further, the Publication describes use of rubbed polyimide, silane coupling agent having a long chain alkyl group and deposited layer of silicon oxide, to orient the compound, although the layers are not employed in Example. The cured layer of the Publication, however, dose not show negative birefringence. Hence, the resulting compensatory sheet cannot enlarge satisfactorily the viewing angle from all directions.

Thus, the above known optical compensatory sheets comprising a support film, an orientation layer of the polymer and a liquid crystalline compound layer, however, cannot greatly enlarge the viewing angle from all directions.

EP 646829 A1 discloses an optical compensatory sheet greatly enlarging the viewing angle from all directions. The optical compensatory sheet has a representative structure comprising a transparent support, an orientation layer such as a rubbed polyvinyl alcohol layer thereon, and an optically anisotropic layer of discotic liquid crystalline compound provided on the orientation layer.

In the sheet of EP 646829 A1, use of the discotic liquid crystalline compound brings about enlargement of the viewing angle. According to the inventor, however, the orientation layer is not satisfactorily capable of keeping stable orientation of the discotic liquid crystalline compound under high temperature and humidity. In more detail, in the case that the optical compensatory sheet is stored or employed for a long time, it is occasionally found that reticulation occurs on the optically anisotropic layer or the optically anisotropic layer is exfoliated from the orientation layer.

SUMMARY OF THE INVENTION

It is an object of the invention to provide an optical compensatory sheet which has an excellent durability, gives an enlarged viewing angle, and can be easily prepared.

It is another object of the invention to provide a process for preparing easily an optical compensatory sheet in high productivity, the sheet having features of showing an excellent durability and giving an enlarged viewing angle.

It is a further object of the invention to provide a liquid crystal display provided with an optical compensatory sheet which has an enlarged viewing angle and an excellent durability and which is almost free from reversion of black-and-white image or gradation.

It is a further object of the invention to provide a color liquid crystal display provided with an optical compensatory sheet which has an enlarged viewing angle, an excellent durability and which is almost free from reversion of black-and-white image or gradation.

There is provided by the invention an optical compensatory sheet which comprises a transparent support, an orientation layer provided thereon and an optically anisotropic layer provided on the orientation layer which comprises a compound having a discotic structure unit, wherein the orientation layer is a crosslinked polymer layer a surface of which has been subjected to rubbing treatment.

Preferred optical compensatory sheets according to the invention are as follows:

1) The optical compensatory sheet wherein a polymer of the crosslinked polymer is prepared by crosslinking a water-soluble resin (preferably polyvinyl alcohol or denatured (or modified) polyvinyl alcohol) in the layer.

2) The optical compensatory sheet described in 1) above wherein the denatured polyvinyl alcohol is obtained by reacting polyvinyl alcohol with a compound of the formula (1):

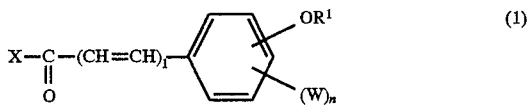

in which $R^1$ represents an alkyl group or an alkyl group substituted with alkyl, acryloyl, methacryloyl or oxiranyl (epoxy); W represents a halogen atom, an alkyl group or an alkoxy group; X represents an atomic group for forming active ester, acid anhydride or acyl halide together with —CO—; 1 is 0 or 1; and n is an integer of 0 to 4.

3) The optical compensatory sheet wherein the crosslinked polymer layer is obtained by reacting a polymer with a crosslinking agent.

4) The optical compensatory sheet which has the minimum absolute retardation value in a direction inclined from the normal of the sheet, the minimum value being not zero (i.e., the optical compensatory sheet has an optical anisotropy wherein the direction of the minimum absolute retardation value in the directions at all angles to the normal of the layer is not present in the directions at a normal direction and a surface direction of the layer and the retardation value is not zero in any directions). The optically anisotropic layer of the sheet preferably also has the above characteristics.

5) The optical compensatory sheet described in 3) above wherein a ratio of the polymer and the crosslinking agent is in the range of 100:0.1 to 100:20, by weight (polymer:crosslinking agent).

6) The optical compensatory sheet wherein the crosslinked polymer contains an unreacted crosslinking agent in the amount of not more than 1.0 weight % (preferably not more than 0.5 weight %).

7) The optical compensatory sheet wherein the transparent support has a light transmittance of not less than 80% and has its optic axis in a direction of the normal of the support.

8) The optical compensatory sheet wherein the transparent support has a negative monoaxial property and its optic axis in a direction of the normal of the support, and satisfies the condition of:

$$20 \leq \{(nx+ny)/2-nz\} \times d \leq 400 \ (nm)$$

in which nx and ny is main refractive indices within the film and nz is a main refractive index in a thickness direction of the film.

9) The optical compensatory sheet wherein the optically anisotropic layer has negative birefringence.

The optical compensatory sheet can be advantageously obtained by a process for the preparation of an optical compensatory sheet which comprises the steps of:

coating on a transparent support a coating solution of a polymer and a crosslinking agent capable of crosslinking the polymer in a solvent to form a coated layer of the polymer;

heating the coated layer of the polymer to crosslink the polymer with the crosslinking agent whereby a crosslinked polymer layer is formed;

subjecting the crosslinked polymer layer to rubbing treatment to form an orientation layer;

coating on the orientation layer a coating solution of a compound having a discotic structure unit in a solvent to form a coated layer of the compound;

heating the coated layer of the compound to a temperature for forming discotic nematic phase of the compound to orient the compound in the layer; and cooling the coated layer to give an optically anisotropic layer.

Further, there is provided by the invention a liquid crystal display comprising a liquid crystal cell which comprises a pair of substrates each of which is provided with a transparent electrode and twisted nematic liquid crystal sealed therebetween, a polarizing sheet arranged on each side of the liquid crystal cell, and an optical compensatory sheet provided between at least one side of the liquid crystal cell and the polarizing sheet:

wherein the optical compensatory sheet comprises a transparent support, an orientation layer provided thereon and an optically anisotropic layer provided on the orientation layer which comprises a compound having a discotic structure unit, the orientation layer being a crosslinked polymer layer a surface of which has been subjected to rubbing treatment.

Furthermore, there is provided by the invention a color liquid crystal display comprising a liquid crystal cell which comprises a pair of substrates provided with a transparent electrode, a transparent electrode of picture element and color filter, and twist-oriented nematic liquid crystal sealed between the substrates, a polarizing sheet arranged on each side of the cell, and an optical compensatory sheet provided between at least one side of the liquid crystal cell and the polarizing sheet:

wherein the optical compensatory sheet comprises a transparent support, an orientation layer provided thereon and an optically anisotropic layer provided on the orientation layer which comprises a compound having a discotic structure unit, the orientation layer being a crosslinked polymer layer a surface of which has been subjected to rubbing treatment.

Preferred color liquid crystal displays according to the invention are as follows:

1) The color liquid crystal display wherein a pair of substrates mentioned above is composed of one substrate provided with a transparent electrode of picture element and the other substrate provided with an opposite transparent electrode and color filter.
2) The color liquid crystal display of 1) above wherein the transparent electrode of picture element has TFT (thin-film-transistor) or MIM (metal-insulator-metal) element as non-linear active element.
3) The color liquid crystal display wherein the absorption axes of two polarizing plates meet at right angles and which is for normally white mode.
4) The color liquid crystal display wherein the absorption axes of two polarizing plates are parallel and which is for normally black mode.

In the optical compensatory sheet of the invention, the polymer of orientation layer is crosslinked to enhance the bonding strength between the orientation layer and the optically anisotropic layer provided on the orientation layer. Therefore the optical compensatory sheet exhibits an excellent durability as well as an enlarged viewing angle.

The liquid crystal display provided with the sheet shows an enlarged viewing angle and is almost free from reversion of black-and-white image or gradation, and further exhibits an excellent durability.

Moreover, the color liquid crystal display of the invention provided with the optical compensatory sheet also shows an enlarged viewing angle and is almost free from reversion of black-and-white image or gradation, and further exhibits an excellent durability.

DETAILED DESCRIPTION OF THE INVENTION

Figure 1:
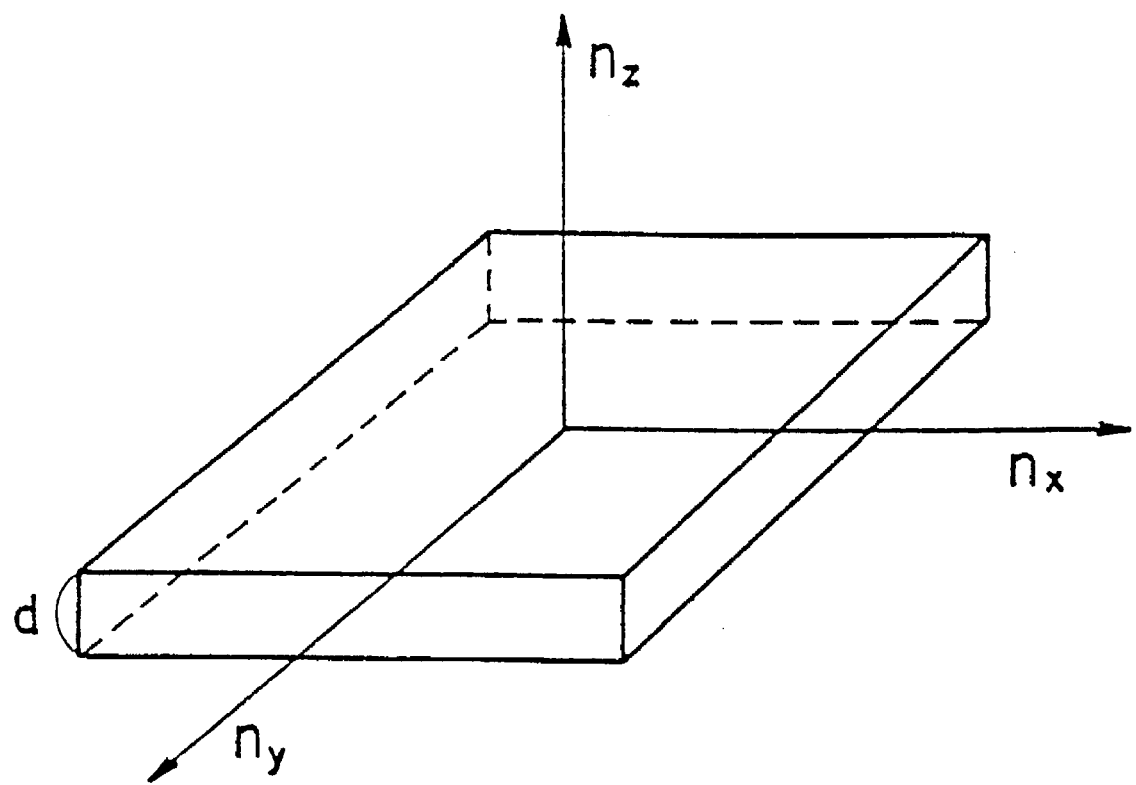
FIG. 1 is a view schematically showing the refractive indices of the three axes of the transparent support (film) of the invention.

The optical compensatory sheet of the invention has a basic structure that a transparent support, an orientation layer and an optically anisotropic layer which comprises a compound having a discotic structure unit are superposed in order. The sheet is characterized in that a polymer of the orientation layer is a crosslinked polymer. The orientation layer is a crosslinked polymer layer a surface of which has been subjected to rubbing treatment.

Examples of the compound having a discotic structure unit in its molecule includes a discotic liquid crystalline compound having low molecular weight such as monomer and a polymer obtained by polymerization of a polymerizable discotic liquid crystalline compound.

The discotic compounds (compounds having a discotic structure unit) are generally classified into two groups, i.e., a compound having discotic liquid crystalline phase (e.g., discotic nematic phase) and a compound having no discotic liquid crystalline phase. The discotic compound generally has a negative birefringence. The optically anisotropic layer of the invention utilizes the negative birefringence of the discotic compound. In the invention, the orientation layer on which the anisotropic layer is formed comprises a crosslinked polymer mentioned above.

The optical compensatory sheet of the invention is basically composed of the transparent support, the orientation layer thereon and an optically anisotropic layer provided on the orientation layer. A subbing layer (i.e., adhesive layer) is preferably provided between the transparent support and the orientation layer. A protective layer may be provided on the layer or on another side of the support.

As material of the transparent support of the invention, any material can be employed, so long as it is transparent. The material preferably is a film having a light transmittance of not less than 80% and especially showing optical isotropy when it is viewed from a front side. Further, the film preferably has a negative uniaxial property and an optic axis in the normal line direction.

Therefore, the film is preferably prepared from material having a small intrinsic birefringence, such as triacetyl cellulose. Such material is available on market by the tradename of Geonex (from Nippon Geon Co., Ltd.), Arton (from Japan Synthetic Rubber Co., Ltd.), and FUJITAC (from Fuji Photo Film Co., Ltd.). Moreover, materials having a large intrinsic birefringence such as polycarbonate, polyarylate, polysulfone and polyethersulfone are also employable by rendering the materials optically isotropic by appropriately controlling molecular orientation in the procedure of forming the film.

The transparent film generally satisfies the condition of:

$$nz<nx=ny$$

and preferably satisfies the condition of:

$$20 \leq \{(nx+ny)/2-nz\} \times d \leq 400 \ (nm)$$

in which nx and ny are main refractive indices within the film and nz is a main refractive index in a thickness direction of the film and d is the depth (i.e., thickness) of the film, and more preferably satisfies the condition of:

$$30 \leq [(nx+ny)/2-nz] \times d \leq 150$$

In practical, it is not required that nx is exactly equal to ny, and it is satisfactory condition that nx is almost equal to ny. Therefore, the transparent film preferably satisfies the condition of:

$$|nx-ny|/|nx-nz| \leq 0.2$$

in which nx and ny have the same meanings as above.

Further, "|nx−ny|×d" of retardation from the front side (when the display is viewed from the front side) preferably is not more than 50 nm, especially not more than 20 nm.

"nx", "ny", "nz" and "d" described above are shown in FIG. 1. "nx" and "ny" are main refractive indices on the plane of the film, "nz" is a main refractive index in a thickness direction of the transparent support, and d is the thickness of the film.

A subbing layer is preferably formed on the transparent support to increase bonding strength between the transparent support and the orientation layer. Material of the subbing layer generally is gelatin.

The orientation layer is provided on the transparent support or the subbing layer. The orientation layer has a function of defining orientation of a discotic liquid crystalline compound to be provided thereon by a coating method, and the orientation of the discotic compound gives the direction of the minimum absolute retardation value (including optic axis) inclined from the normal of an optical compensatory sheet.

In the known optical compensatory sheet composed of a transparent support, an orientation layer and an optically anisotropic layer of a compound having a discotic structure unit, which shows excellent optical characteristics such as an enlarged viewing angle, polyvinyl alcohol is generally employed without crosslinking as material for forming an orientation layer. In the case that the optical compensatory sheet having the orientation layer is kept or used at high temperature and humidity, reticulation is occasionally generated on the optically anisotropic layer or the optically anisotropic layer occasionally peels off the orientation layer.

Use of the orientation layer of the invention keeps the optically anisotropic layer from occurrence of reticulation and peeling. The orientation layer can be formed by reacting a polymer or a polymer having a polymerizable group with a crosslinking agent having high reactivity to introduce a connecting group derived from the crosslinking agent into the polymer, or crosslinking a polymer having a polymerizable group with no crosslinking agent, and subjecting the crosslinked polymer layer to rubbing treatment. The crosslinking is generally performed by application of heat or light or by control of pH.

In more detail, the crosslinked polymer layer (to be transformed into an orientation layer by rubbing) is generally provided by coating on a transparent support a coating solution of a polymer or a combination of a polymer and a crosslinking agent in a solvent, and then heating the coated layer to undergo the crosslinking reaction. When the heating in this step does not give sufficient crosslinking due to low temperature, the later heating for orientation of optically anisotropic layer can give sufficient crosslinking. Subsequently, the crosslinked polymer layer is subjected to rubbing treatment, and then a coating solution of a compound having a discotic structure unit in a solvent is coated on the orientation layer and the coated layer is heated to a temperature for forming the discotic nematic phase of the compound to orient the compound in the layer. Thereafter, the oriented layer is cooled to form an optically anisotropic layer.

In the formation of the orientation layer and optically anisotropic layer, a treatment such as heating for crosslinking may be conducted in any step of from formation of the orientation layer to final treatment for obtaining an optical compensatory sheet, because durability (high bonding strength between orientation layer and optically anisotropic layer) should be given to the resultant optical compensatory sheet. For example, in the case that the crosslinking agent has low reactivity, the crosslinking of the agent and the polymer occasionally further proceeds after orientation of discotic compound of the optically anisotropic layer, whereby a satisfactory crosslinking can be obtained. Moreover, for example, the following process can be utilized: a process wherein a coating solution in which a photopolymerization initiator is added to a mixture of a polymer having a polymerizable group (and a crosslinking agent) is coated on the support, dried (or crosslinked), and further crosslinked by UV irradiation after orientation of discotic compound of the optically anisotropic layer.

As polymers for the orientation layer, both of polymers capable of reacting with a crosslinking agent and polymers having a polymerizable group for crosslinking per se, can be employed. The polymers which have the polymerizable group and are capable of reacting with a crosslinking agent can be also preferably employed.

Examples of the preferred polymers include polymethyl methacrylate, acrylic acid/methacrylic acid copolymer, styrene/maleinimide copolymer, polyvinyl alcohol, denatured polyvinyl alcohol, poly(N-methylolacrylamide), styrene/vinyltoluene copolymer, chlorosulfonated polyethylene, nitrocellulose, polyvinyl chloride, chlorinated polyolefin, polyester, polyimide, vinyl acetate/vinyl chloride copolymer, ethylene/vinyl acetate copolymer, carboxymethyl cellulose, polyethylene, polypropylene, and polycarbonate. Organic substances such as silane coupling agents may be employed together with the polymer.

Preferred examples of the polymers (for preparation of the orientation layer) include water-soluble polymers such as polyvinyl alcohol, denatured polyvinyl alcohol, poly(N-methytotacrylamide), carborymethyl cellulose and gelatin. Especially, polyvinyl alcohol, denatured polyvinyl alcohol and gelatin are preferred, and polyvinyl alcohol and denatured polyvinyl alcohol are most preferred.

The polyvinyl alcohol or denatured polyvinyl alcohol generally has saponification degree in the range of 70 to 100%, preferably in the range of 80 to 100%, and especially in the range of 85 to 95%. A polymerization degree of the above polyvinyl alcohol or denatured polyvinyl alcohol preferably is in the range of 100 to 3,000.

Examples of the denatured polyvinyl alcohols include polyvinyl alcohols denatured by copolymerization having a group such as —COONa, —Si(OX)$_3$ [X: hydrogen or halogen], —N(CH$_3$)$_3$·Cl, C$_9$H$_{19}$COO—, —SO$_3$Na or —C$_{12}$H$_{25}$; polyvinyl alcohols denatured by incorporation of chain-transfer agent employed in copolymerization having a terminated group such as —COONa, —SH or C$_{12}$H$_{25}$S—; and polyvinyl alcohols denatured by block-copolymerization having a group such as —COOH, —CONH$_2$, —COOR [R: alkyl] or C$_6$H$_5$—. Preferred are polyvinyl alcohols which are not denatured, and denatured polyvinyl alcohol having alkylthio group (C$_{12}$H$_{25}$S—).

The denatured polyvinyl alcohol preferably is a polymer obtained by reacting polyvinyl alcohol with a compound of the formula (1):

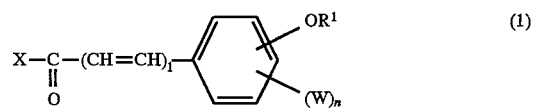

(1)

in which R$^1$ represents an alkyl group or an alkyl group substituted with alkyl, acryloyl, methacryloyl or oxiranyl; W represents a halogen atom, an alkyl group or an alkoxy group; X represents an atomic group for forming active ester, acid anhydride or acyl halide together with —CO—; 1 is 0 or 1; and n is an integer of 0 to 4. The alkyl group of R$^1$ preferably has 2 to 24 carbon atoms, and the alkyl group and alkoxy group of W preferably have 2 to 24 carbon atoms.

The formula (I) preferably is in the form of the following formula (2):

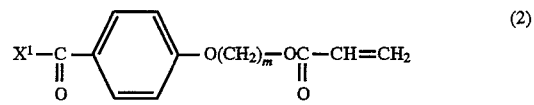

(2)

in which X$^1$ represents an atomic group for forming active ester, acid anhydride or acyl halide together with —CO—; and m is an integer of 2 to 24.

Examples of polyvinyl alcohols to be employed to react with the compound of the formula (1) or (2) include polyvinyl alcohols and denatured polyvinyl alcohols described above (i.e., polyvinyl alcohols denatured by copolymerization, polyvinyl alcohols denatured by incorporation of chain-transfer agent; and polyvinyl alcohols denatured by block-copolymerization).

Examples of polyvinyl alcohols obtained by reacting the compound of the formula (1) or (2) with the polyvinyl alcohol are described below:

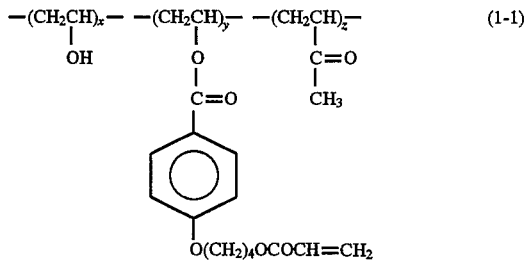

(1-1)

In the formula 1-1, examples of x, y and z are described below:

|  | x (molar %) | y (molar %) | z (molar %) |
|---|---|---|---|
| Polymer No. A | 87.8 | 0.2 | 12 |
| Polymer No. B | 88.0 | 0.003 | 12 |
| Polymer No. C | 87.86 | 0.14 | 12 |
| Polymer No. D | 87.94 | 0.06 | 12 |
| Polymer No. E | 86.9 | 1.1 | 12 |
| Polymer No. F | 98.5 | 0.5 | 1.0 |
| Polymer No. G | 97.8 | 0.2 | 2.0 |
| Polymer No. H | 96.5 | 2.5 | 1.0 |
| Polymer No. I | 94.9 | 4.1 | 1.0 |

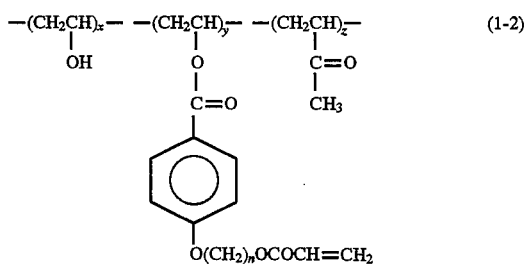

(1-2)

In the formula 1-2, examples of x, y and z are described below:

|  | n | x (molar %) | y (molar %) | z (molar %) |
|---|---|---|---|---|
| Polymer No. J | 3 | 87.8 | 0.2 | 12 |
| Polymer No. K | 5 | 87.85 | 0.15 | 12 |
| Polymer No. L | 6 | 87.7 | 0.3 | 12 |
| Polymer No. M | 8 | 87.7 | 0.3 | 12 |

Units of the recurring units of the following polymers are molar %.

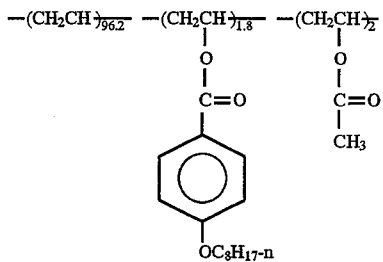

Polymer No. N

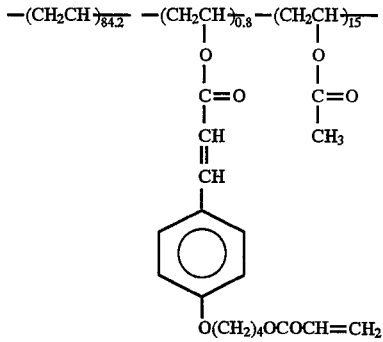

Polymer No. O

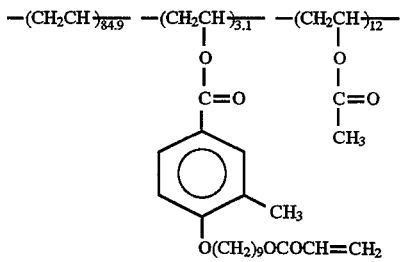

Polymer No. P

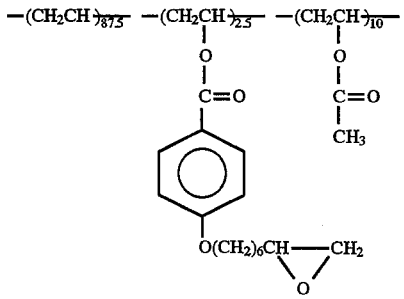

Polymer No. Q

The above polymers No. A to Q can be crosslinked per se.
A synthetic example of the polyvinyl alcohol is described below.
Synthesis of Polymer No. A (mentioned above)
In a 500-ml three-necked flask equipped with a stirrer, 26.4 g of polyvinyl alcohol (saponification value: 88 molar %; MP-203 available from Kuraray Co., Ltd.) and 225 ml of dimethylsulfoxide (DMSO; having been dehydrated using Molecular sieve 4A) were placed, and stirred at room temperature to dissolve the polyvinyl alcohol in dimethylsulfoxide, whereby a PVA solution was obtained.
Separately, in a 50-ml three-necked flask equipped with a stirrer, 1.55 ml (20 millimoles) of methanesulfonylchloride and 20 ml of tetrahydrofuran (THF) were placed to prepare a methanesulfonylchloride solution. A solution of 5.28 g of 4-(4-acryloyloxybutoxy)benzoic acid and 3.42 ml (20 millimoles) of diisopropylethylamine in 20 ml of THF was dropwise added with stirring at a temperature of 0° C. to the methanesulfonylchloride solution. After the addition was complete, the reaction mixture was stirred at a temperature of 0° C. for 30 minutes to prepare a mixed acid anhydride of 4-(4-acryloyloxybutoxy)benzoic acid and methanesulfonylchloride.

To the PVA solution obtained previously, 3.42 ml (20 millimoles) of diisopropylethylamine and 0.24 g (2 millimoles) of dimethylaminopyridine were added to prepare a solution. To the solution, the above mixed acid anhydride was slowly added with stirring at room temperature, and stirred at room temperature for 6 hours. Thereafter, the reaction solution was allowed to stand overnight. The color of the resultant reaction solution was pale yellow. The resultant reaction was filtered through a paper towel to remove impurities. The filtered reaction solution was dropwise added with stirring to 2.25 liters of ethyl acetate to precipitate a polymer. The polymer was white crude precipitate. The polymer was then washed in 700 ml of methyl alcohol, separated by filtration and dried, whereby 22.1 g of a massive polymer (polymer No. A; yield: 84%) was obtained.

[Data of the polymer No. A]

NMR spectrum (solvent: DMSO-$d_6$)

The spectrum showed signals assigned to protons of main chain, acetyl group and hydroxyl group of the polymer, and further showed signals assigned to protons of phenylene group and vinyl group as given below, that MP-203 did not show.

$\delta$=7.9 ppm, 7.0 ppm (assigned to proton of phenylene group)

$\delta$=6.3 ppm, 6.2 ppm, 5.9 ppm (assigned to proton of vinyl group)

Visible absorption spectrum

In a 100-ml measuring flask, 0.1 g of the polymer was placed, and distilled water was added to the polymer to prepare a 0.1% aqueous polymer solution. A visible absorption spectrum of the solution was measured in a ultra-violet-visible spectrophotometer (UV-2200, available from Shimadzu Seisakusyo, Ltd.).

Wavelength of absorption maximum: 260 nm

Absorbance (260 nm): 0.788

A visible absorption spectrum of the polyvinyl alcohol MP-203 (raw material) was measured in the same manner as above. No absorption maximum was found in the wavelength range of 220 to 400 nm, and a weak absorption which gradually lowers from shorter wavelength to longer wavelength was found in the range. The measurement showed the following visible absorption spectrum.

Absorbance (260 nm): 0.011

Determination of acryloyloxy group incorporation ratio (y)

The 4-(4-acryloyloxybutoxy)benzoic acid used in the synthesis example was reacted with methanol to produce its methyl ester compound. The methyl ester compound was dissolved in methanol to prepare the methyl ester compound methanol solution ($1\times10^{-4}$ M). A visible absorption spectrum of the solution was measured in the same manner as above.

Wavelength of absorption maximum ($\lambda_{max}$): 260 nm

Absorbance (260 nm): 1.84

Molecular extinction coefficient ($\epsilon$): $1.84\times10^4$ $M^{-1}\cdot$cm

The obtained data show that increase of absorbance (260 nm) of polymer No. A is derived from incorporation of 4-(4-acryloyloxybutoxy)benzoic acid into hydroxyl group of the polyvinyl alcohol. Therefore, acrytoyloxy group incorporation ratio (y) was calculated based on the data of absorbances (260 nm) to determine y (=0.21).

The denatured polyvinyl alcohol derived from the formula (1) and polyvinyl alcohol can be employed singly or in combination with other one or more polymers as a polymer or polymers for forming the orientation layer of the present invention. The polymer for forming the orientation layer preferably contains the denatured polyvinyl alcohol derived from the formula (1) and polyvinyl alcohol in the amount of not less than 10 weight %, especially in the amount of not less than 30 weight %.

The denatured polyvinyl alcohol may be a polymer represented by the formula (3):

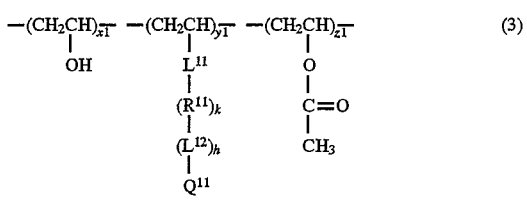

(3)

wherein $L^{11}$ represents an ether bonding, a urethane bonding, an acetal bonding or an ester bonding;

$R^{11}$ represents an alkylene group or an alkyleneoxy group;

$L^{12}$ represents a connecting group for linking $R^{11}$ with $Q^{11}$;

$Q^{11}$ represents vinyl, oxiranyl or aziridinyl;

x1 is in the range of 10 to 99.9 molar %, y1 is in the range of 0.01 to 80 molar % and z1 is in the range of 0 to 70 molar %, under the condition of x1+y1+z1=100; and each of k and h independently represents 0 or 1.

In the formula (3), $R^{11}$ is —$R^2$— or —$R^3$—(O—$CH_2CH_2$)$_t$— in which each of $R^2$ and $R^3$ independently represents alkylene of 1 to 12 carbon atoms and t is an integer of 0 to 2, and especially $R^{11}$ represents alkylene of 1 to 12 carbon atoms; and $L^{12}$ represents —O—, —S—, —CO—, —O—CO—, —CO—O—, —O—CO—O—, —CO—O—CO—, —NRCO—, —CONR—, —NR—, —NRCONR—, —NRCO—O—, or —OCONR— in which R represents hydrogen or lower alkyl (preferably —O—, —O—CO—, or —OCONR—).

Further, the denatured polyvinyl alcohol may be a polymer represented by the formula (4):

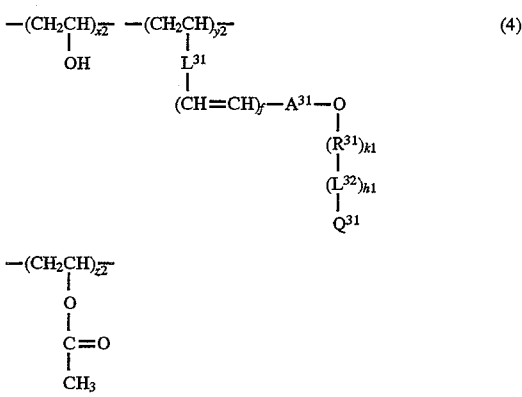

(4)

wherein $L^{31}$ represents an ether bonding, a urethane bonding, an acetal bonding or an ester bonding;

$A^{31}$ represents an arylene group of 6 to 24 carbon atoms or an arylene group of 6 to 24 carbon atoms which is substituted with halogen, alkyl of 1 to 4 carbon atoms or alkoxy of 1 to 4 carbon atoms;

$R^{31}$ represents —$R^2$— or —$R^3$— (O—$CH_2CH_2$)$_t$— in which each of $R^2$ and $R^3$ independently represents alkylene of 1 to 12 carbon atoms and t is an integer of 0 to 2;

$L^{32}$ represents —O—, —S—, —CO—, —O—CO—, —CO—O—, —O—CO—O—, —CO—O—CO—, —NRCO—, —CONR—, —NR—, —NRCONR—, —NRCO—O— or —OCONR— in which R represents hydrogen or lower alkyl (preferably —O—, —O—CO—, or —OCONR—);

$Q^{31}$ represents vinyl, oxiranyl or aziridinyl;

x2 is in the range of 10 to 99.9 molar %, y2 is in the range of 0.01 to 80 molar % and z2 is in the range of 0 to 70 molar %, under the condition of x2+y2+z2=100; and each of k1 and h1 independently represents 0 or 1.

Examples of the crosslinking agents employed together with the polymer include aldehydes such as formaldehyde, glyoxal and glutaraldehyde; N-methylol compounds such as dimethylol urea and methyloldimethylhydantoin; dioxane derivatives such as 2,3-dihydroxydioxane; compounds capable of reacting by activation of carboxyl group of polymer such as carbenium, 2-naphthalene sulfonate, 1,1-bispyrrolydino- 1-chloropyridine and 1-morphorinocarbonyl-3-(sulfonatoaminomethyl); activated vinyl compounds such as 1,3,5-triacryloyl-hexahydro-s-triazine, bis(vinylsulfone)methane and N,N'-methylenebis-[β-(vinylsulfonyl)propionamide]; activated halogen-containing compounds such as 2,4-dichloro-6-dihydroxy-s-triazine; isooxazoles; and dialdehyde starch. These compounds are preferably employed together with water-soluble polymer described previously, especially polyvinyl alcohol and denatured polyvinyl alcohols such as the denatured polyvinyl alcohol derived from the formula (1) and polyvinyl alcohol.

Aldehydes having high reactivity (especially glutaraldehyde) are preferred from the viewpoint of productivity.

As the crosslinking agent, any compounds other than the above compounds may be employed so long as they can crosslink the polymer. Although a increased amount (e.g., an amount of not less than 50 weight % based on that of polymer) of the agent improve resistance to humidity, it reduces function of defining an orientation direction of a discotic liquid crystalline compound. Therefore, the agent is generally employed in an amount of 0.1 to 20 weight % based on the polymer, preferably in an amount of 0.5 to 15 weight %, and especially in an amount of 1.5 to 15 weight %.

The orientation layer crosslinked with a crosslinking agent generally contains a crosslinking agent in some extent. The orientation layer generally contains a crosslinking agent in an amount of not more than 1.0 weight %, especially in an amount of not more than 0.5 weight %. The orientation layer containing a crosslinking agent of more than 1.0 weight % does not show satisfactory durability. In more detail, when an optical compensatory sheet using the orientation layer containing the crosslinking agent of more than 1.0 weight % is incorporated in a liquid crystal display, the display occasionally generates reticulation after it is allowed to stand under the conditions of high temperature and humidity.

The orientation layer can be generally formed by coating on a transparent support a coating solution of a polymer or a combination of a polymer and a crosslinking agent in a solvent, then heating the coated layer to crosslink, and subjecting the crosslinked polymer layer to rubbing treatment, as mentioned previously. In the case that a water-soluble resin such as polyvinyl alcohol is employed as polymer for forming the orientation layer, as a solvent for the polymer, preferred is a mixed solvent consisting of water and an organic solvent such as alcohol (e.g., methyl alcohol) which shows anti-forming property. A ratio of water and methyl alcohol generally is in the range of 99:1 to 9:91, preferably 95:5 to 10:90, especially 90:10 to 40:60, by weight. The use of the solvent brings about formation of the orientation layer and optically anisotropic layer almost free from occurrence of defect on their surfaces because occurrence of foam is depressed in the coating procedures of the orientation layer.

Examples of the organic solvents other than alcohols include polar solvents such as N,N-dimethylformamide (DMF), dimethylsulfoxide (DMSO), N,N-dimethylacetoamide and pyridine; ethers such as tetrahydrofuran and 1,2-dimethoxyethane; ketones such as acetone and methyl ethyl ketone; and halogenated hydrocarbons such as dichloromethane and chloroform. The solvent may be employed singly or in combination. Preferred are DMSO and ethers.

Examples of the method for coating the solution for forming the orientation layer includes curtain coating method, extrusion coating method, dip coating method, spin coating method, spin coating method and bar coating method. Preferred are bar coating method and extrusion coating method. The coated layer of the solution for forming the orientation layer is generally dried by heating at a temperature of 20° to 110° C. To sufficiently crosslink the coated layer (i.e., layer of polymer and crosslinking agent), the layer is preferably heated at a temperature of 60° to 100° C., especially 80° to 100° C. A time period for the drying is preferably is in the range of 1 minute to 36 hours, preferably 5 to 30 minutes. pH of the coating solution is preferably adjusted to an appropriate value depending upon the used crosslinked agent. For example, when glutaraldehyde is used as the crosslinking agent, pH of the coating solution is preferably adjusted to a value of 4.5 to 5.5, especially to a value of 5.0.

A thickness of the orientation layer preferably is in the range of 0.1 to 10 μm.

The crosslinked polymer layer is subjected to rubbing treatment. The rubbing treatment can be conducted in the known manner which is conventionally employed to prepare an orientation layer or surface for liquid crystal of LCD. In more detail, the treatment is performed to give a function of orienting a liquid crystal to a surface of the orientation layer by rubbing the surface in a certain direction by the use of paper, gauze, felt, rubber, or fiber of polyamide or polyester. The rubbing treatment is generally performed by rubbing a surface of the orientation layer in several times using cloth.

The optically anisotropic layer of the invention is formed on the orientation layer. The optically anisotropic layer comprises a compound having a discotic structure unit in its molecule which has a negative birefringence. In more detail, the layer generally comprises a discotic liquid crystalline compound or a polymer that a polymerizable discotic liquid crystalline compound is polymerized (cured). The optically anisotropic layer preferably comprises the polymer.

Examples of the discotic liquid crystalline compound employed in the invention include the following compounds:

Examples of the compounds include benzene derivatives described in C. Destrade et al., Mol. Cryst. vol. 71, pp. 111, 1981; truxene derivatives described in C. Destrade et al., Mol Cryst. vol. 122, pp. 141. 1985 and Physics lett. A, vol. 78, pp. 82, 1980; cyclohexane derivatives described in B. Kohn et al., Angew. Chem. vol. 96, pp. 70, 1984; and macrocyclic compounds of azacrown-type or phenylacetylene-type described in J. M. Lehn et al., J. Chem. Commun. pp. 1794, 1985, and J. Zhang et al., J. Am.

Chem. Soc. vol. 116, pp.2655, 1994. The discotic liquid crystalline compound generally has a structure that the above compound is located at a center of the crystal as a parent core and further straight chain groups such as alkyl, alkoxy and benzoyl having a substituent are radially bonded to the compound. As the discotic liquid crystalline compounds, any discotic liquid crystalline compounds can be used, so long as they have a negative birefringence (negative uniaxial property) and orientation property.

Preferred examples of the discotic liquid crystalline compounds employable in the invention are described below.

TE-1
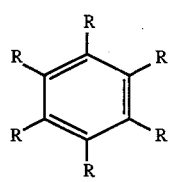

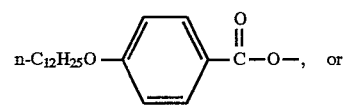

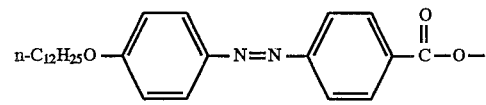

TE-2
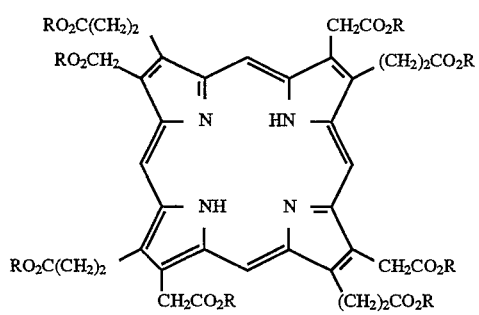

R: n-$C_{12}H_{25}$—

TE-3
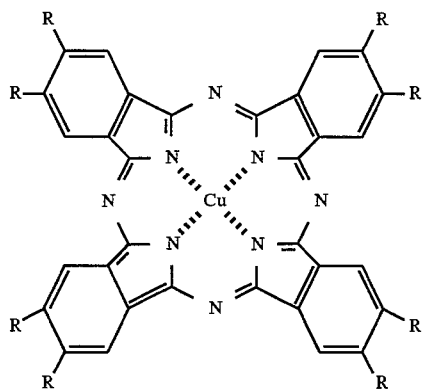

R: n-$C_{12}H_{25}OCH_2$—

TE-4
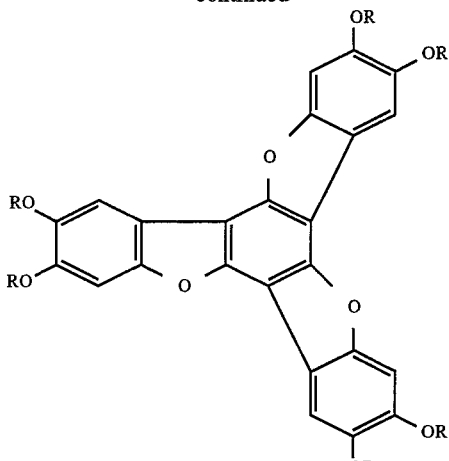

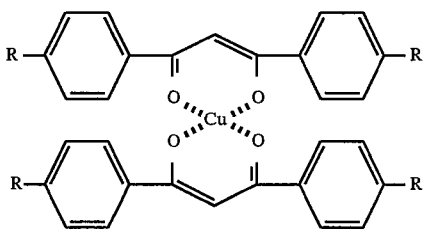

R: n-$C_{12}H_{25}O$—⟨⟩—C(=O)— or n-$C_{13}H_{27}CO$—

TE-5
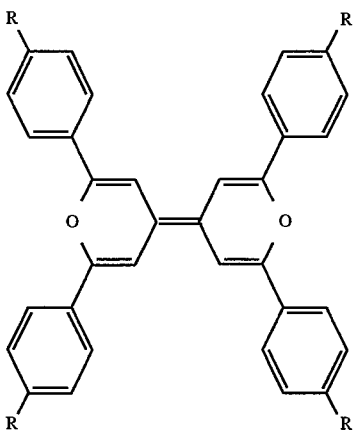

R: n-$C_{10}H_{21}$—

TE-6
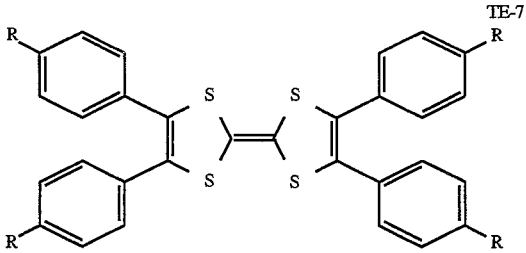

R: n-$C_8H_{17}$—

TE-7
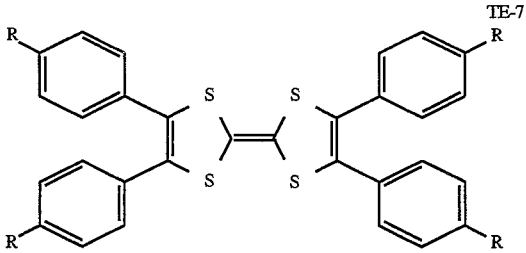

R: n-$C_{16}H_{33}O$—

17
-continued
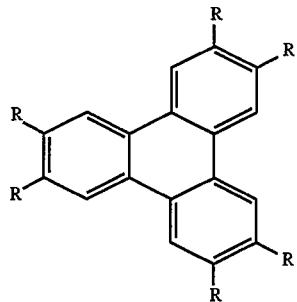
TE-8
R: (1)
n-C$_m$H$_{2m+1}$O—
(m = an integer of 2–15),
(2)
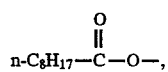
(3)
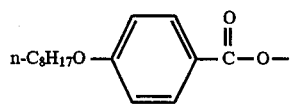
(4)
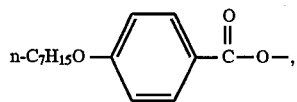
(5)
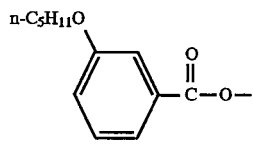
(6)
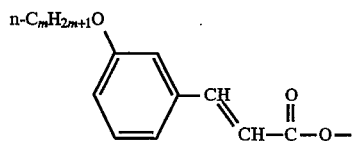
(m = an integer of 7–10),
(7)
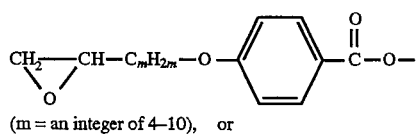
(m = an integer of 4–10), or
(8)
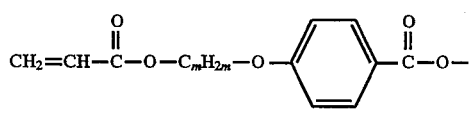
(m = an integer of 4–10)
18
-continued
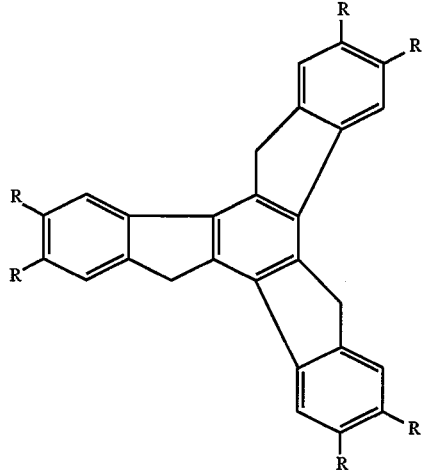
TE-9
R: (1)
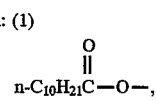
(2)
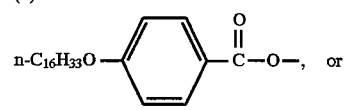  or
(3)
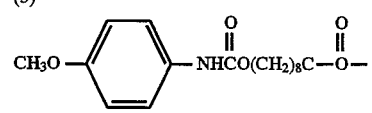
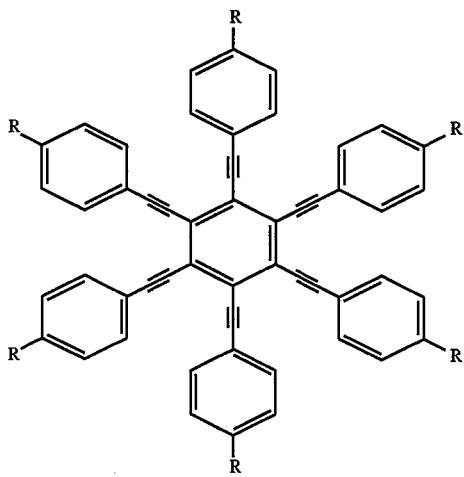
TE-10
R: C$_7$H$_{15}$O—
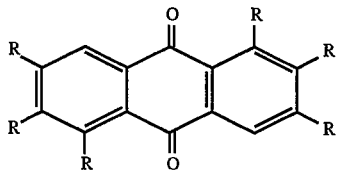
TE-11
R: (1)
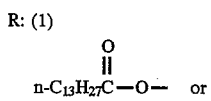  or (2)

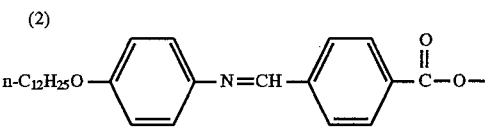

The optical compensatory sheet is prepared by forming an orientation layer on a transparent support and forming an optically anisotropic layer on the orientation layer, as mentioned previously.

The optically anisotropic layer is formed of a compound having a discotic structure unit, and the discotic structure unit preferably has a plane inclined from a plane of the transparent support at an angle varying along a direction of depth of the optically anisotropic layer. The discotic structure unit is originated from the discotic liquid crystalline compound or polymer thereof.

The above angle (inclined angle) of the plane of discotic structure unit generally increases or decreases with increase of distance in the direction of depth from the bottom of the optically anisotropic layer. The inclined angle preferably increases with increase of the distance. Further, examples of variation of the inclined angle include continuous increase, continuous decrease, intermittent increase, intermittent decrease, variation containing continuous increase and decrease, and intermittent variation containing increase or decrease. The intermittent variation contains an area that the inclined angle does not vary in the course of the thickness direction of the layer. The inclined angle preferably totally increases or decreases in the layer, even if it does not vary in the course. The inclined angle more preferably increases totally, and especially continuously increases.

Figure 2:
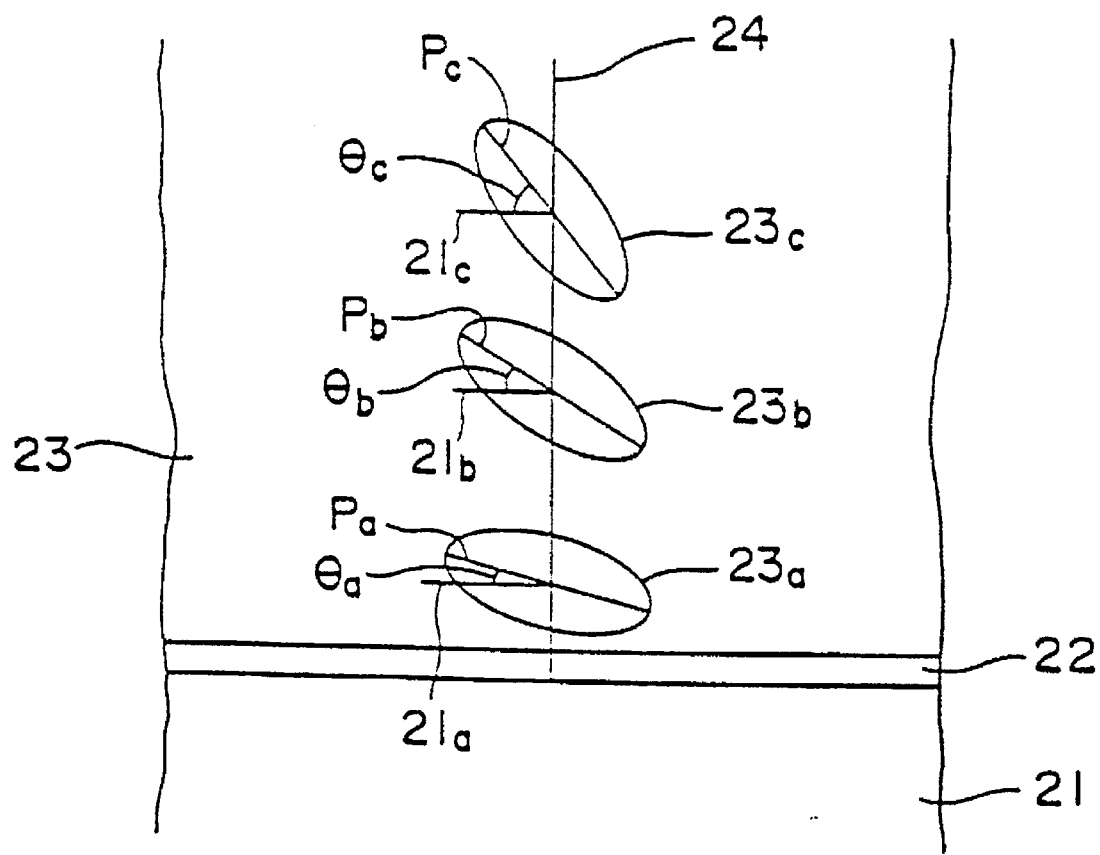
FIG. 2 is a view schematically showing a representative structure of the optically anisotropic layer of the invention.

The section view of the representative optically anisotropic layer of the invention is schematically shown in FIG. 2.

The optically anisotropic layer 23 is provided on the orientation layer 22 which is formed on the transparent support 21. The discotic liquid crystalline compounds 23a, 23b and 23c constituting the optically anisotropic layer 23 are arranged on the orientation layer 22 in such a manner that the planes of discotic structure units Pa, Pb and Pc, are inclined from planes 21a, 21b and 21c which are parallel to a plane of the transparent support 21 and the inclined angles θa, θb and θc (angle between the plane of discotic structure unit and the plane of transparent support) increase, in order, with increase of distance in a direction of depth (thickness) from a bottom of the optically anisotropic layer. The reference number 24 is the normal of the transparent support.

The discotic liquid crystalline compound is a planar molecule, and therefore has only one plane (e.g., 21a, 21b, 21c) in the molecule.

The inclined angle generally varies within the range of 5 to 85 degree (preferably 10 to 80 degrees). The minimum of the inclined angle generally is in the range of 0 to 85 degrees (preferably 5 to 40 degrees) and the maximum of the inclined angle is in the range of an angle of 5 to 90 degree (preferably 30 to 85 degrees). In FIG. 2, the inclined angle of the plane of discotic unit (e.g., θa) on the support side approximately corresponds to the minimum, and the inclined angle (e.g., θc) approximately corresponds to the maximum. Further, the difference of the minimum (e.g., the inclined angle of the discotic unit on the support side) and the maximum (e.g., the inclined angle on a surface side) preferably is in the range of 5 to 70 degrees (especially 10 to 60 degrees).

The optically anisotropic layer can be generally prepared by coating a solution of the discotic compound and other compound in a solvent on the orientation layer, dried, heating to temperature for forming a discotic nematic phase and cooling with keeping the oriented condition (discotic nematic phase). Otherwise, the layer can be prepared by coating a solution of a polymerizable discotic compound and other compound in a solvent on the orientation layer, dried heating to temperature for forming a discotic nematic phase, polymerizing the heated layer (e.g., by radiation of UV light) and cooling. The discotic compound employed in the invention preferably has a transition temperature from discotic nematic phase to solid phase in the range of 70° to 300° C., especially 70° to 170° C.

For example, the inclined angle of the discotic unit on the support side can be generally controlled by selection of discotic compounds or materials of the orientation layer, or selection of methods for rubbing treatment (e.g., rubbing angle). The inclined angle of the discotic unit on a surface side (air side) can be controlled by selection of discotic compounds or other compounds (e.g., plasticizer, surface active agent, polymerizable monomer and polymer) employed together with the discotic liquid crystalline compound. Further, the extent of variation of the inclined angle can be also controlled by the above selection.

As the plasticizer, surface active agent or polymerizable monomer, any compounds can be employed so long as they are compatible with the discotic compound and have properties of giving variation of the inclined angle of the discotic liquid crystalline compound or not inhibiting orientation of the discotic liquid crystalline compound. Preferred is a polymerizable monomer (e.g., compounds having a vinyl, vinyloxy, acryloyl or methacryloyl group). The compound are preferably used in the amount of 1 to 50 weight % (especially 5 to 30 weight %) based on the amount of the discotic compound.

As examples of polymer, any polymers can be employed, so long as they are compatible with the discotic compound and are capable of giving variation of the inclined angle of the discotic liquid crystalline compound. Preferred are cellulose esters. Examples of the cellulose esters include acetylcellulose, acetylpropionylcellulose (i.e., cellulose acetate propionate), hydroxypropylcellulose, and acetylbutyrylcellutose (i.e., cellulose acetate burylate). Preferred is acetylbutyrylcellulose. The polymer are generally used in the amount of 0.1 to 10 weight % (preferably 0.1 to 8.0 weight % and especially 0.1 to 5.0 weight %) based on the amount of the discotic compound, so as not to inhibit orientation of the discotic liquid crystalline compound.

A (color) liquid crystal display provided with the optically anisotropic layer (optical compensatory sheet) having the varying inclined angle indicated in FIG. 2 has a greatly enlarged viewing angle, and almost free from reversion of black-and-white image or gradation and coloring of a displayed image.

The reason why the above optical compensatory sheet gives much increase of viewing angle is assumed as follows:

Most of TN-LCD adopt normally white mode. In the mode, a light transmittance in a black displayed portion extremely increases with increase of viewing angle, which results in rapid reduction of contrast.

Figure 3:
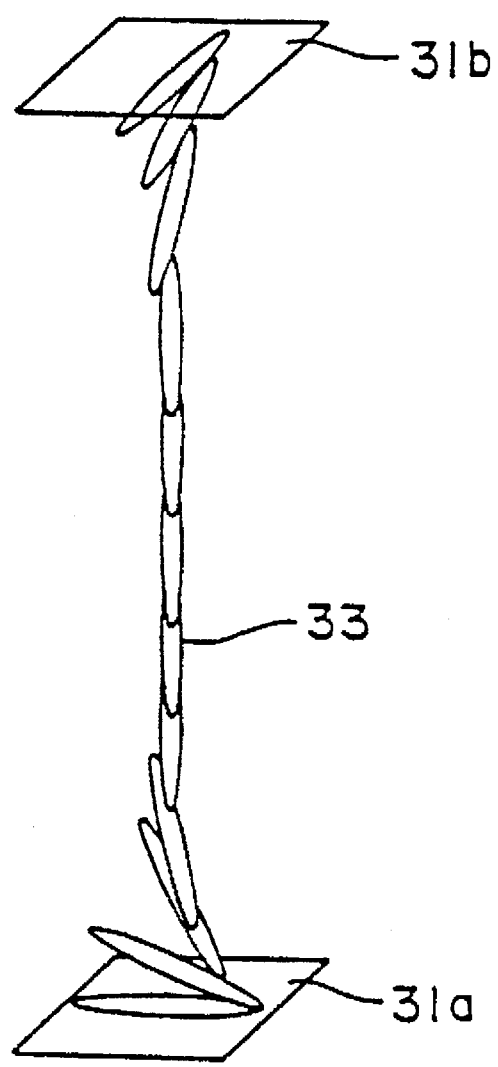
FIG. 3 is a view schematically showing a representative structure of a liquid crystal layer of a liquid crystal display.

In the black display (on application of voltage), nematic liquid crystal molecules in the liquid crystal cell are arranged as shown in FIG. 3. The liquid crystal molecule 33 which is located in the vicinity of a surface of the substrate 31, is almost parallel to a surface of the substrate 31a, and the liquid crystal molecule 33 is increasingly inclined from the surface with increase of distance from the surface and becomes perpendicular to the surface. Further, the liquid crystal molecule 33 is increasingly inclined in the opposite direction with increase of distance from the surface and finally becomes almost parallel to the surface of the substrate 31b. Hence, the liquid crystal cell in TN-LCD on the black display (on application of voltage) can be regarded as a composite which is composed of two positive anisotropic bodies having an optic axis (direction showing the minimum of Re) inclined increasingly from the surface of the cell and two positive anisotropic bodies having an optic axis parallel to the normal of the surface of the cell.

For the reason, both the variation of the inclined angle of discotic structure unit of the optically anisotropic layer and the negative birefringence compensate phase difference produced by the inclined angle of the liquid crystal molecules of the liquid crystal cell on application of voltage. Thus, the color liquid crystal display provided with the optical compensatory sheet having the optically anisotropic layer is improved in the viewing characteristics such as coloring of a displayed image and reversing of black-and-white image or gradation when the viewing direction to the liquid crystal display is greatly inclined from the normal to a surface of the screen.

Figure 4:
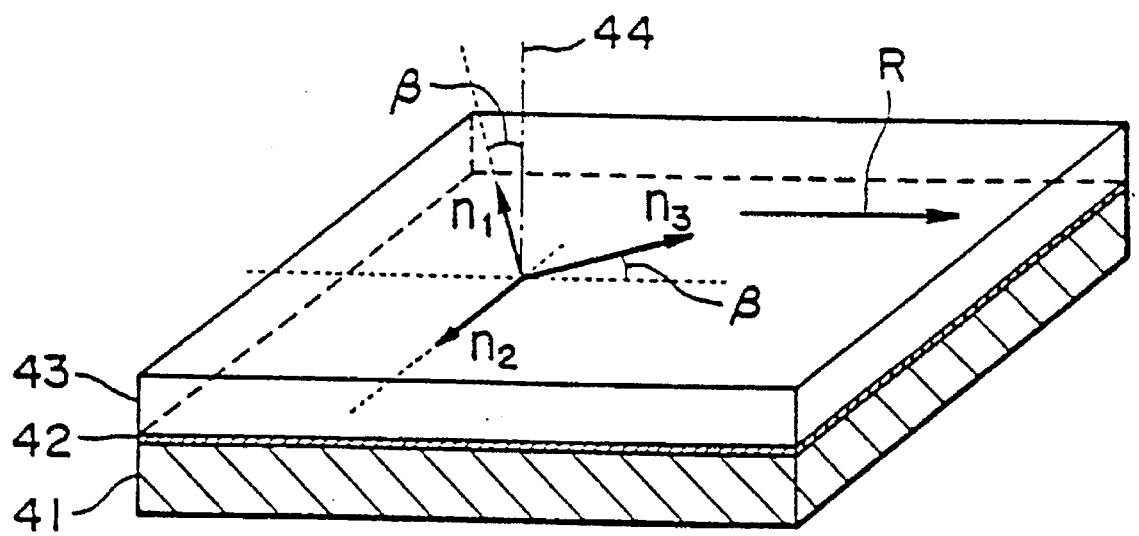
FIG. 4 is a view schematically showing the refractive indices of the three axes of the optical compensatory sheet of the invention.

The optically anisotropic layer generally has the minimum absolute retardation value in a direction inclined from the normal of the sheet and the minimum absolute retardation value is not zero. The representative structure of the optical compensatory sheet containing the optically anisotropic layer of the invention is shown in FIG. 4. In Pig. 4, a transparent support 41, an orientation layer 42 and a layer of discotic liquid crystal 43 are superposed in order to constitute the optical compensatory sheet. The reference number R indicates the rubbing direction of the orientation layer. The reference numbers $n_i$, $n_2$ and $n_3$ indicate refractive indices in the three axes direction of the optical compensatory sheet, and $n_1$, $n_2$ and $n_3$ satisfy the condition of $n_1 \leq n_2 \leq n_3$, in the case that are seen in the front direction. The reference number $\beta$ is an inclined angle of the direction showing the minimum of Re from the normal 44 of the optical compensatory sheet.

In order to greatly improve the viewing angle characteristics of TN-LCD or TFT-LCD, the direction showing the minimum retardation value of the optical compensatory sheet is preferably inclined at 5 to 50 degrees from a normal line of the sheet ($\beta$ in FIG. 4) and especially 10 to 40 degrees.

Further, it is preferred that the sheet satisfies the condition of:

$$50 \leq \{(n_3+n_2)/2-n_1\} \times D \leq 400 \ (nm)$$

in which D is a thickness of the sheet; and especially the condition of:

$$100 \leq \{(n_3+n_2)/2-n_1\} \times D \leq 400 \ (nm)$$

The solution for forming the optically anisotropic layer is prepared by dissolving the discotic compound(s) and other compounds described previously in a solvent.

Examples of solvents employable for dissolving the compound therein, include polar solvents such as N,N-dimethylformamide (DMF), dimethyl sulfoxide (DMSO) and pyridine, nonpolar solvents such as benzene and hexane, alkyl halides such as chloroform and dichloromethane, esters such as methyl acetate and butyl acetate, ketones such as acetone and methyl ethyl ketone, and ethers such tetrahydrofuran and 1,2-dimethoxyethane. Preferred are alkyl halides and ketones. The solvents may be employed singly or in combination.

Examples of the method for coating the above solution thereof includes curtain coating method, extrusion coating method, roll coating method, dip coating method, spin coating method, print coating method, coating method using slide coater and spray coating method. In the invention, vapor deposition method may be used, in the case of a mixture of only discotic compounds. In the invention, a continuously coating method is preferred. Therefore, coating methods such as curtain coating method, extrusion coating method, roll coating method and coating method using slide coater are preferred.

As mentioned above, the optical compensatory sheet can be prepared by coating the coating solution on the orientation layer, heating the coated solution to a temperature of not less than glass transition temperature (further curing the layer by irradiation of UV light, if desired), and cooling the layer to room temperature.

In the optical compensatory sheet of the invention, "Dispersion" depending on wavelength generally equals to that of the liquid crystal cell. For example, $R_{450}/R_{550}$ (Dispersion) preferably is not less than 1.0, in which $R_{450}$ represents retardation of the sheet to light of 450 nm and $R_{550}$ represents retardation of the sheet to light of 550

Figure 5:
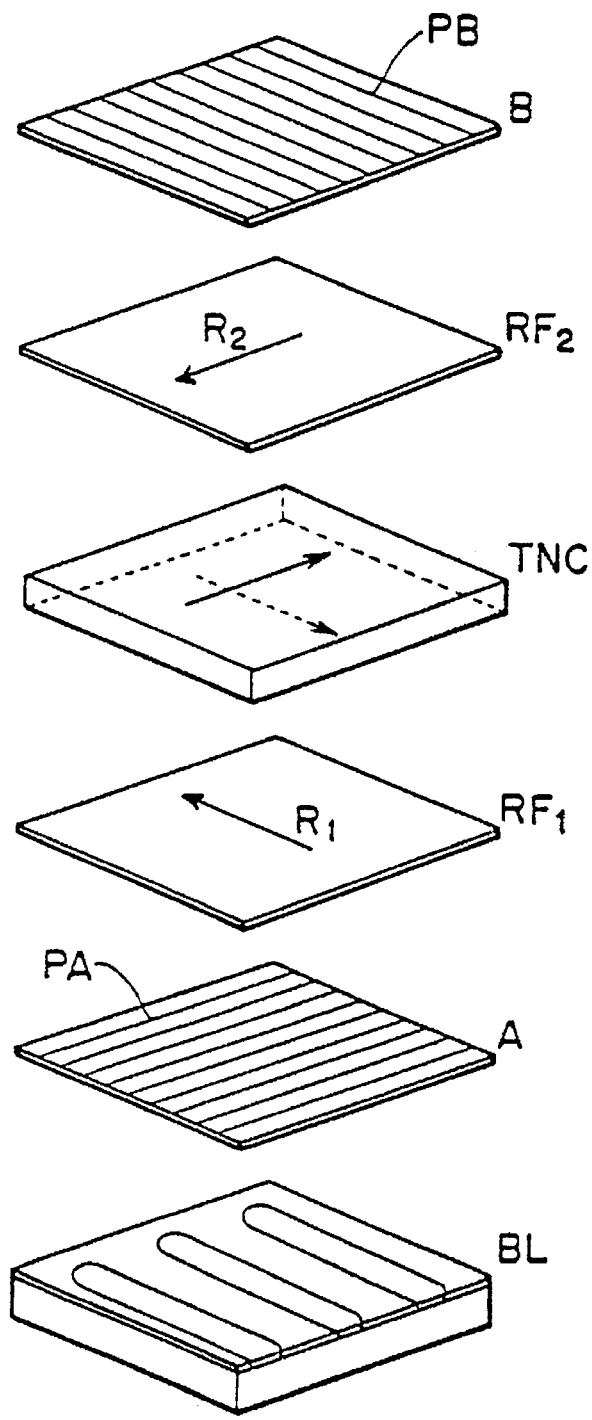
FIG. 5 is a view schematically showing a representative structure of the liquid crystal display of the invention.

The representative structure of the liquid crystal display of the invention is shown in FIG. 5. In FIG. 5, a liquid crystal cell TNC comprising a pair of substrates provided with a transparent electrode and a twist-oriented nematic liquid crystal sealed therebetween, a pair of polarizing plates A and B arranged on the both sides of the cell, the optical compensatory sheets $RF_1$ and $RF_2$ between the liquid crystal cell and the polarizing sheet and back light BL are assembled to constitute the liquid crystal display. The optical compensatory sheet may be arranged only on one side (i.e., use of one of $RF_1$ and $RF_2$). The reference number $R_1$ is for a rubbing direction of the orientation layer of the optical compensatory sheet $RF_1$, and the reference number $R_2$ is for the rubbing direction of the orientation layer of the optical compensatory sheet $RF_2$, in the case that are seen in the front direction. An arrow of a solid line of the liquid crystal cell TNC indicates the rubbing direction of the polarizing sheet B side substrate of TNC, and an arrow of a dotted line of the liquid crystal cell TNC indicates the rubbing direction of the polarizing sheet A side substrate of TNC. PA and PB show polarizing axes of polarizing sheets A and B, respectively.

Figure 6:
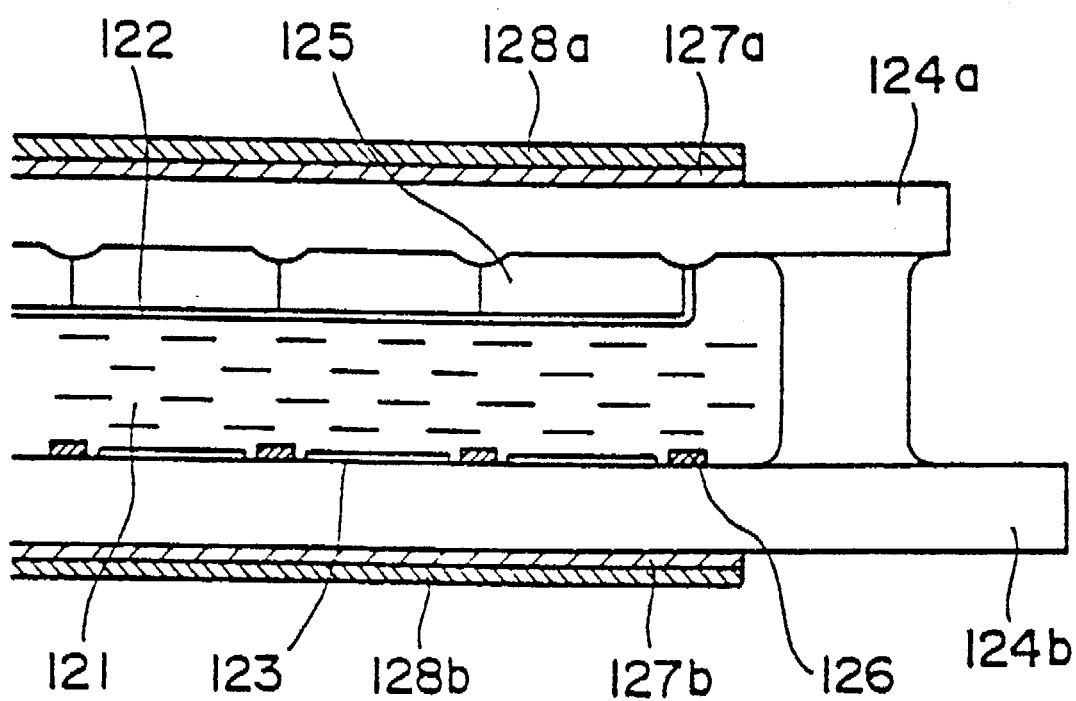
FIG. 6 is a sectional view schematically showing a representative structure of the color liquid crystal display of the invention.

Further, the representative structure of the color liquid crystal display of the invention is shown in FIG. 6. In FIG. 6, a liquid crystal cell comprising a glass substrate 124a provided with an opposite transparent electrode 122 and color filter 125, a glass substrate 124b provided with an electrode for picture element 123 and TFT (thin-film-transistor) 126, and twist-oriented nematic liquid crystal 121 sealed between the substrates, a pair of polarizing plates 128a and 128b arranged on both sides of the cell, and a pair of optical compensatory sheets 127a and 127b provided between the liquid crystal cell and the polarizing plate are assembled to constitute the color liquid crystal display. The optical compensatory sheet may be arranged only on one side (i.e., use of one of 128a and 128b).

As the color filter, any color filter can be utilized so long as it has high purity of hue, precise dimension and good heat-resistance. Examples of the color filter include dyed filter, printed filter, electro-deposited filter and pigment-dispersed filter, which are described in Color Liquid Crystal Display (Syunsuke Kobayashi, pp. 172–173 and pp. 237–251, Sangaku Tosho, 1990) and Flat Panel Display 1994 (Edited by Nikkei Microdevice, pp. 216, Nikkei BP Corporation). The dyed filter can be, for example, prepared by adding dichromate to a substrate such as gelatin, casein or polyvinyl alcohol to give the substrate photosensitive property, forming a pattern on the photosensitive substrate by photolithography and dyeing.

Preferred examples of the twist-oriented nematic liquid crystals include nematic liquid crystals described in Handbook of Liquid Crystal Device (Edited by No. 142 Commission of Japan Society for the Promotion of Science, pp. 107–213, Nikkan Kogyo Newspaper Office).

The long axis of the nematic liquid crystal is twisted at approx. 90 degrees and oriented between both substrates of the liquid crystal cell. Therefore, a linearly polarized light incident upon the liquid crystal cell is passed through the cell to become a light having polarized direction changed by 90 degrees due to optical rotatory power of the cell, when no voltage is applied to the cell. When a high voltage of not less than threshold value is applied to the cell, the direction of the long axis of the nematic liquid crystal is changed to that of the applied voltage and the long axis is arranged perpendicular to the surface of substrate (electrode), whereby the optical rotatory power disappears.

To obtain an effective (namely, in high contrast) response by the optical rotatory power, the twisted angle preferably is in the range of 70 to 100 degrees, especially 80 to 90 degrees.

Further, it is preferred that the liquid crystal molecule is pre-tilted to give a pre-tilted angle in order to depress occurrence of disclination in the condition of the application of voltage. The pre-tilted angle preferably is not more than 5 degrees, especially in the range of 2 to 4 degrees. Details of the twisted-angle and pre-tilted angle are shown in Application Edition of Liquid Crystal (Mistuji Okano and Syunsuke Kobayashi, pp. 16–28, Baifukan).

The product ($\Delta n \cdot d$) of refractive index anisotropy (birefringence) of the liquid crystal cell ($\Delta n$) and a thickness of the liquid crystal layer of the cell (d) preferably is in the range of 0.3 to 1.0 μm, especially 0.3 to 0.6 μm. Details of the product ($\Delta n \cdot d$) are described in Handbook of Liquid Crystal Device (Edited by No. 142 Commission of Japan Society for the Promotion of Science, pp. 329–337, Nikkan Kogyo Newspaper Office).

Signals utilized in the color liquid crystal display of the invention, is preferably composed of alternating current of 5 to 100 Hz and voltage of not more than 20V (especially not more than 8V). In normally white mode, bright display is usually conducted in 0 to 1.5V, medium contrast display is usually done in 1.5 to 3.0V, and dark display is usually conducted in 3.0V and more. Details of the signals are described in Handbook of Liquid Crystal Device (Edited by No. 142 Commission of Japan Society for the Promotion of Science, pp. 387–465, Nikkan Kogyo Newspaper Office) and Application Edition of Liquid Crystal (Mistuji Okano and Syunsuke Kobayashi, pp. 85–105, Baifukan).

Materials for the polarizing plate employable in the color liquid crystal display and the liquid crystal display previously described are not restricted and any material can be employed. Generally, a polarizing plate is composed of a polarizing film and a protective film provided thereon, and the polarizing film is, for example, prepared by treating a hydrophilic polymer such as a stretched polyvinyl alcohol film with iodine or dichloric dye. The protective film is generally prepared by stretching triacetylcellulose.

Examples of the present invention and comparison examples are given below, but these examples by no means are construed to restrict the invention.

EXAMPLE 1

Formation of orientation layer

On a triacetyl cellulose film having a thickness of 100 μm (available from Fuji Photo Film Co., Ltd.), a thin layer of gelatin (0.1 μm) was formed. The following coating solution for forming an orientation layer was coated on the gelatin layer using a bar coater, dried using warm air (60° C.) for 4 minutes to form a crosslinked polymer layer having a thickness of 0.5 μm.

[Coating solution for forming orientation layer]

| Denatured polyvinyl alcohol (previously mentioned polymer No. A) | 10 g |
|---|---|
| Water | 371 g |
| Methanol | 119 g |
| Glutaraldehyde (crosslinking agent) | 0.5 g |

A surface of the resultant crosslinked polymer layer was subjected to rubbing treatment using a rubbing roller (outer diameter of 150 mm) in the conditions of rate of movement of the film of 10 m/min., the number of revolution of the rubbing roller of 1,200 rpm, and the tension for conveying the glass substrate of 4 kgf/cm (width of substrate), whereby an orientation layer was formed.

Formation of layer of discotic liquid crystalline compound

On the orientation layer, a coating solution obtained by dissolving a mixture of 1.6 g of the discotic liquid crystalline compound TE-8-(8, m=4) (compound previously mentioned), 0.2 g of ethylene glycol modified-trimethylolpropane triacrylate (V#360, available from Osaka Organic Chemical Industry Co., Ltd.), 0.04 g of acetylbutyrylcellulose (CAB551-0.2, available from Eastman Chemical Co.), 0.06 g of photopolymerization initiator (Irgacure-907, available from Ciba-Geigy) and 0.02 g of sensitizer (Kayacure-DETX, available from Nippon Kayaku Co., Ltd.) in 3.43 g of methyl ethyl ketone was coated using a wire-bar coater (#3 bar). The coated film was fixed in a metal frame, and heated in a thermostat at a temperature of 120° C. for 3 minutes to orient the discotic liquid crystalline compound of the coated layer. Subsequently, UV light was irradiated on the coated layer using a high-pressure mercury lamp (120W/cm) in intensity of illumination of 600 mW/cm$^2$ for one second under heating at 120° C. and cooled to room temperature to form an optically anisotropic layer having a thickness of 1.8 μm. Thus, an optical compensatory sheet (RF-1) was obtained.

EXAMPLE 2

The procedures of Example 1 were repeated except for using the following composition as a composition of the coating solution for forming orientation layer, and conducting rubbing treatment in the following conditions, to prepare an optical compensatory sheet (RF-2).

[Composition of coating solution for forming orientation layer]

| Denatured polyvinyl alcohol (previously mentioned polymer No. J) | 10 g |
|---|---|
| Water | 294 g |
| Methanol | 196 g |
| Glutaraldehyde (crosslinking agent) | 0.5 g |

[Conditions of rubbing treatment]

A surface of the resultant crosslinked polymer layer was subjected to a rubbing treatment using a rubbing roller (outer diameter of 150 mm) in the conditions of rate of movement of the film of 10 m/min., the number of revolution of the rubbing roller of 1,300 rpm, and the tension for conveying the glass substrate of 4 kgf/cm (width of substrate).

EXAMPLE 3

The procedures of Example 1 were repeated except for using the following composition as a composition of the coating solution for forming orientation layer, to prepare an optical compensatory sheet (RF-3).

[Composition of coating solution for forming orientation layer]

| | |
|---|---|
| Denatured polyvinyl alcohol (previously mentioned polymer No. B) | 10 g |
| Water | 490 g |
| Glyoxal (crosslinking agent) | 0.5 g |

COMPARISON EXAMPLE 1

The procedures of Example 1 were repeated except for using the following composition as a composition of the coating solution for forming orientation layer, to prepare an optical compensatory sheet (RF-4).

[Composition of coating solution for forming orientation layer]

| | |
|---|---|
| Polyvinyl alcohol (MP203, available from Kuraray Co., Ltd.) | 10 g |
| Water | 371 g |
| Methanol | 119 g |

EXAMPLE 4

The procedures of Example 1 were repeated except for changing the temperature for drying the coated layer of the coating solution for forming orientation layer from 60° C. for 4 minutes to 80° C. for 4 minutes, to prepare an optical compensatory sheet (RF-5).

EXAMPLE 5

The procedures of Example 1 were repeated except for changing the temperature for drying the coated layer of the coating solution for forming orientation layer from 60° C. for 4 minutes to 90° C. for 4 minutes, to prepare an optical compensatory sheet (RF-6).

EXAMPLE 6

The procedures of Example 1 were repeated except for changing the triacetyl cellulose film (available from Fuji Photo Film Co., Ltd.) to a triacetyl cellulose film having a thickness of 100 μm (ARTON, available from Japan Synthetic Rubber Co., Ltd.), and changing the temperature for drying the coated layer of the coating solution for forming orientation layer from 60° C. for 4 minutes to 90° C. for 4 minutes, to prepare an optical compensatory sheet (RF-7).

[Evaluation of optical compensatory sheet]

As for the optical compensatory sheets obtained in Examples 1 to 6 and Comparison Example 1, the optical characteristics were evaluated in the manners described below.

(1) Condition of surface of optically anisotropic layer

The surface of the optically anisotropic layer was observed by a polarization micrometer under crossed Nicols.

The above evaluation is ranked as follows:

AA: there is no surface streaking
CC: there is surface streaking (2) Inclined angle (β) of direction showing the minimum retardation value As to the optical compensatory sheet, the thickness was measured with a micrometer, and Re values in various directions with respect to a plane which contains a rubbing axis and is perpendicular to the sheet were measured by an ellipsometer (AEP-100, available from Shimadzu Seisakusho, Ltd.).

From the above data, inclined angle (β) of direction showing the minimum retardation value of the optical compensatory sheet, was determined by calculation.

Further, the data revealed that the resultant optically anisotropic layers have negative birefringence. Furthermore, the resultant support all had an optic axis in normal direction.

(3) Resistance to moist heat (A) and (B)

(A) The optical compensatory sheet was stuck on a glass plate to form a composite, and the composite was allowed to stand in an atmosphere of 70° C. and 95%RH for 150 hours. The tested optical compensatory sheet was observed.

(B) The optical compensatory sheet was stuck on a glass plate to form a composite, and the composite was allowed to stand in an atmosphere of 70° C. and 95%RH for 500 hours. The tested optical compensatory sheet was observed.

The evaluation of the above observation is ranked as follows:

AA: there is no reticulation
CC: there is reticulation (4) Remaining amount (residue) of crosslinking agent in an orientation layer The crosslinking agent in the orientation layer formed on the support was extracted with water. In the procedure a drop of Schiff's reagent was added to the extract (i.e., extracted aqueous solution), and absorbance (540 mμ) of the resultant extract was measured by a spectrophotometer. Remaining amount of crosslinking agent in the orientation layer was determined from the obtained absorbance with reference to a working curve of the crosslinking agent.

The crosslinking agents and solvents employed for forming orientation layers of the resultant optical compensatory sheets were set forth in Table 1, and the obtained results were set forth in Table 2.

TABLE 1

| Example | Sheet No. | Crosslinking Agent (weight %) | Composition of solvent (weight ratio) |
|---|---|---|---|
| Ex. 1 | RF-1 | Glutaraldehyde (5 weight %) | Water/Methanol (= 371/119) |
| Ex. 2 | RF-2 | Glutaraldehyde (5 weight %) | Water/Methanol (= 294/196) |
| Ex. 3 | RF-3 | Glyoxal (5 weight %) | Water |
| Co. Ex. 1 | RF-4 | — | Water/Methanol (= 371/119) |
| Ex. 4 | RF-5 | Glutaraldehyde (5 weight %) | Water/Methanol (= 371/119) |
| Ex. 5 | RF-6 | Glutaraldehyde (5 weight %) | Water/Methanol (= 371/119) |
| Ex. 6 | RF-7 | Glutaraldehyde (5 weight %) | Water/Methanol (= 371/119) |

TABLE 2

| Example | Sheet No. | Condition of Surface | Angle (β) of Re Minimum Direction (degree) | Resistance to moist heat (A) | (B) | Remaining Amount of *C.A. (weight %) |
|---|---|---|---|---|---|---|
| Ex. 1 | RF-1 | AA | 24 | AA | CC | 0.48 |
| Ex. 2 | RF-2 | AA | 26 | AA | CC | 0.50 |
| Ex. 3 | RF-3 | CC | 24 | AA | CC | 0.48 |
| Co. Ex. 1 | RF-4 | AA | 23 | CC | — | — |
| Ex. 4 | RF-5 | AA | 24 | AA | AA | 0.25 |
| Ex. 5 | RF-6 | AA | 24 | AA | AA | 0.15 |
| Ex. 6 | RF-7 | AA | 24 | AA | AA | 0.14 |

Note; *C.A.: crosslinking agent

EXAMPLES 7

Preparation of color liquid crystal display

From a TFT-type color liquid crystal television (6E-3C, available from Sharp Corporation), the polarizing plates were removed. Two optical compensatory sheets (RF-1) obtained in Example 1 were fixed on the television, and two polarizing plates were attached to both sides of the sheet fixed television in such a manner that two polarizing axes of the polarizing plates intersected at right angles. Thus, a color liquid crystal display was prepared.

COMPARISON EXAMPLE 2

Preparation of liquid crystal display

From a TFT-type color liquid crystal television (6E-3C, available from Sharp Corporation), the polarizing plates were removed. The polarizing plates (two plates), which are the same as used Example 7, were attached to both sides of the sheet fixed television in such a manner that two polarizing axes of the polarizing plates intersected at right angles. Thus, a color liquid crystal display was prepared.

[Evaluation of color liquid crystal display]

White image and black image were displayed using the obtained color liquid crystal displays. In the display, transmittances (T) were measured by varying viewing angle using a spectrophotometer (LCD-5000, available from Otsuka Electronics Co., Ltd.). From the measured data, the angle against the normal at which the contrast (white/black) on a black-and-white display showed 10 was defined as viewing angle and the viewing angles in a height (up-down) direction and a width (left-right) direction of the TN-LCD were determined.

The obtained result is set forth in Table 3.

TABLE 3

| Example | Sheet No. | Viewing Angle up-down (degree) | Viewing Angle left-right (degree) |
|---|---|---|---|
| Ex. 7 | RF-1 | 123 | 115 |
| Co. Ex. 2 | None | 50 | 70 |

What is claimed is:

1. An optical compensatory sheet which comprises a transparent support, an orientation layer provided thereon and an optically anisotropic layer provided on the orientation layer which comprises a compound having a discotic structure unit, wherein the orientation layer is a crosslinked polymer layer a surface of which has been subjected to rubbing treatment.

2. The optical compensatory sheet as defined in claim 1, wherein the crosslinked polymer layer is made by crosslinking a layer of water-soluble resin.

3. The optical compensatory sheet as defined in claim 1, wherein the crosslinked polymer layer is a layer of crosslinked polyvinyl alcohol or denatured polyvinyl alcohol.

4. The optical compensatory sheet as defined in claim 3, wherein the denatured polyvinyl alcohol is obtained by reacting polyvinyl alcohol with a compound of the formula (1):

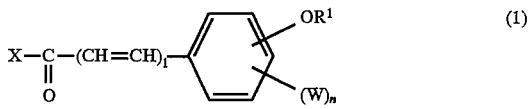

in which $R^1$ represents an alkyl group or an alkyl group substituted with alkyl, acryloyl, methacryloyl or oxiranyl; W represents a halogen atom, an alkyl group or an alkoxy group; X represents an atomic group for forming active ester, acid anhydride or acyl halide together with —CO—; 1 is 0 or 1; and n is an integer of 0 to 4.

5. The optical compensatory sheet as defined in claim 1, wherein the crosslinked polymer layer is obtained by reacting a polymer with a crosslinking agent.

6. The optical compensatory sheet as defined in claim 5, wherein a ratio of the polymer and the crosslinking agent is in the range of 100:0.1 to 100:20 by weight.

7. The optical compensatory sheet as defined in claim 1, which has the minimum absolute retardation value in a direction inclined from the normal of the sheet, the minimum value being not zero.

8. The optical compensatory sheet as defined in claim 1, wherein the crosslinked polymer layer contains an unreacted crosslinking agent in the amount of not more than 1.0 weight %.

9. The optical compensatory sheet as defined in claim 1, wherein the transparent support has a light transmittance of not less than 80% and has its optic axis in a direction of the normal of the support.

10. A process for the preparation of an optical compensatory sheet which comprises the steps of:

coating on a transparent support a coating solution of a polymer and a crosslinking agent capable of crosslinking the polymer in a solvent to form a coated layer of the polymer containing the crosslinking agent;

heating the coated layer of the polymer to crosslink the polymer with the crosslinking agent whereby a crosslinked polymer layer is formed;

subjecting the crosslinked polymer layer to rubbing treatment to give an orientation layer;

coating on the orientation layer a coating solution of a compound having a discotic structure unit in a solvent to form a coated layer of the compound;

heating the coated layer of the compound to a temperature for forming discotic nematic phase of the compound to orient the compound in the layer; and cooling the coated layer of compound to give an optically anisotropic layer.

11. The process for the preparation of an optical compensatory sheet as defined in claim 10, wherein the solvent of the coating solution of a polymer and a crosslinking agent is a mixture of water and an organic solvent miscible with water.

12. The process for the preparation of an optical compensatory sheet as defined in claim 10, wherein the solvent of the coating solution of a polymer and a crosslinking agent is mixed solvent comprising a water and methyl alcohol, a ratio of water and methyl alcohol being in the range of 99:1 to 9:99 by weight.

13. The process for the preparation of an optical compensatory sheet as defined in claim 10, wherein the compound having a discotic structure unit has a polymerizable group, and after the coated layer of the compound is heated to a temperature for forming discotic nematic phase, the layer is exposed to UV-light.

14. A liquid crystal display comprising a liquid crystal cell which comprises a pair of substrates each of which is provided with a transparent electrode and twisted nematic liquid crystal sealed therebetween, a polarizing sheet arranged on each side of the liquid crystal cell, and an optical compensatory sheet provided between at least one side of the liquid crystal cell and the polarizing sheet:

wherein the optical compensatory sheet comprises a transparent support, an orientation layer provided thereon and an optically anisotropic layer provided on the orientation layer which comprises a compound having a discotic structure unit, the orientation layer being a crosslinked polymer layer a surface of which has been subjected to rubbing treatment.

15. A color liquid crystal display comprising a liquid crystal cell which comprises a pair of substrates provided with a transparent electrode, a transparent electrode of picture element and color filter, and twist-oriented nematic liquid crystal sealed between the substrates, a polarizing sheet arranged on each side of the liquid crystal cell, and an optical compensatory sheet provided between at least one side of the liquid crystal cell and the polarizing sheet:

wherein the optical compensatory sheet comprises a transparent support, an orientation layer provided thereon and an optically anisotropic layer provided on the orientation layer which comprises a compound having a discotic structure unit, the orientation layer being a crosslinked polymer layer a surface of which has been subjected to rubbing treatment.

* * * * *